United States Patent [19]

Hyouga et al.

[11] Patent Number: 5,388,229
[45] Date of Patent: Feb. 7, 1995

[54] DATA TRANSMISSION SYSTEM WHICH PREFETCHES DATA TO BE TRANSFERRED

[75] Inventors: Yukio Hyouga, Neyagawa; Katsuyuki Kaneko, Moriguchi, both of Japan

[73] Assignee: Matsushita Electric Industrial Co., Ltd., Osaka, Japan

[21] Appl. No.: 136,095

[22] Filed: Oct. 14, 1993

Related U.S. Application Data

[63] Continuation of Ser. No. 690,254, Apr. 23, 1991, abandoned.

[30] Foreign Application Priority Data

Apr. 23, 1990 [JP] Japan .................................. 2-107234

[51] Int. Cl.[6] .............................................. G06F 13/00
[52] U.S. Cl. .................................... 395/325; 395/425; 395/275; 364/DIG. 1; 364/238.4; 364/242.3; 364/242.31; 364/238.6; 364/239.1; 364/239.5; 364/239.51
[58] Field of Search .............. 395/325, 250, 400, 425, 395/550, 575, 725, 200

[56] References Cited

U.S. PATENT DOCUMENTS

| | | | |
|---|---|---|---|
| 4,258,418 | 3/1981 | Heath | 395/250 |
| 4,652,991 | 3/1987 | Yamano | 395/425 |
| 4,779,190 | 10/1988 | O'Dell et al. | 395/500 |
| 4,819,154 | 4/1989 | Stiffler et al. | 395/575 |
| 4,833,605 | 5/1989 | Terada et al. | 395/400 |
| 4,864,533 | 9/1989 | Hanada | 395/425 |
| 4,870,704 | 9/1989 | Matelan et al. | 395/800 |
| 4,910,657 | 3/1990 | Yoshida | 395/375 |
| 5,008,817 | 4/1991 | Shibata et al. | 395/325 |
| 5,068,785 | 11/1991 | Suziyama | 395/325 |
| 5,305,441 | 4/1994 | Okochi et al. | 395/325 |

FOREIGN PATENT DOCUMENTS

| | | |
|---|---|---|
| 0362425 | 4/1990 | European Pat. Off. . |
| 2065938 | 7/1981 | United Kingdom . |
| 2186719 | 8/1987 | United Kingdom . |

OTHER PUBLICATIONS

Computer Design; vol. 24, No. 8 Jul. 1985, Littleton, Mass., pp. 85–88 M. M. Tehranian 'DMA cache speed execution in mixed-bus systems'.

*Primary Examiner*—Jack B. Harvey
*Assistant Examiner*—Ayaz R. Sheikh
*Attorney, Agent, or Firm*—Wenderoth, Lind & Ponack

[57] ABSTRACT

In a data transmission device, before the starting of data transmission, a data conduct device detects an external bus, and an address comparator section compares the value of the address signal line with the output values of the parameter memory section. As the result of the comparison, when it is judged that the data to be transmitted is present on the external bus, the address comparator section transmits a write-execution signal to a bus control unit so that the bus control unit writes the data present on the external bus together with the validity bit thereof into the data memory device. In the period of data transmission, when the data assigned to the address produced by an address generator is present in the data memory device, the data is transmitted to the external destination, and on the other hand, when the data assigned to the address is absent in the data memory device, the bus control unit gains access to the external memory for obtaining the data corresponding to the address, so that the data obtained from the external memory is transmitted to the external destination.

6 Claims, 6 Drawing Sheets

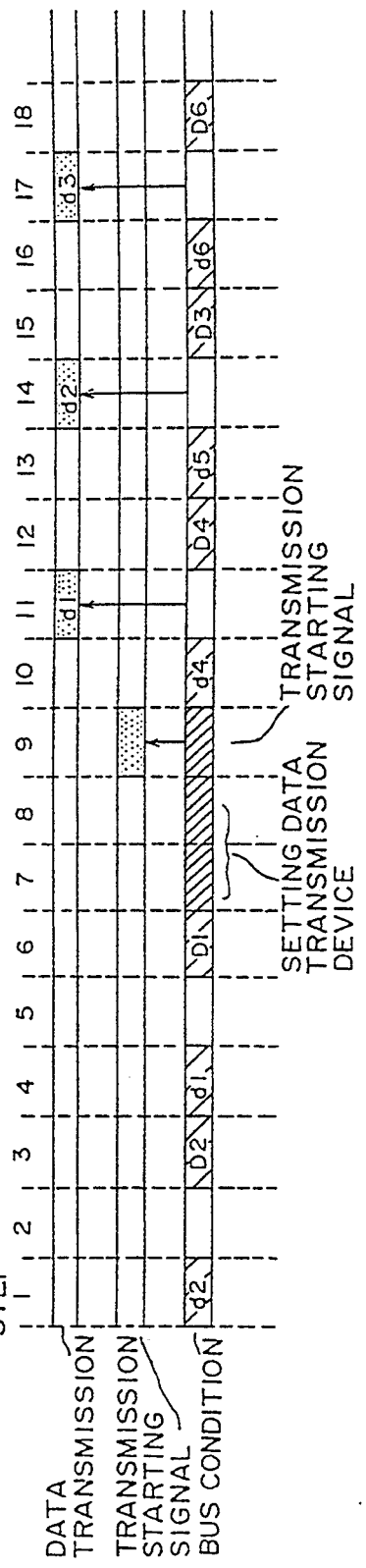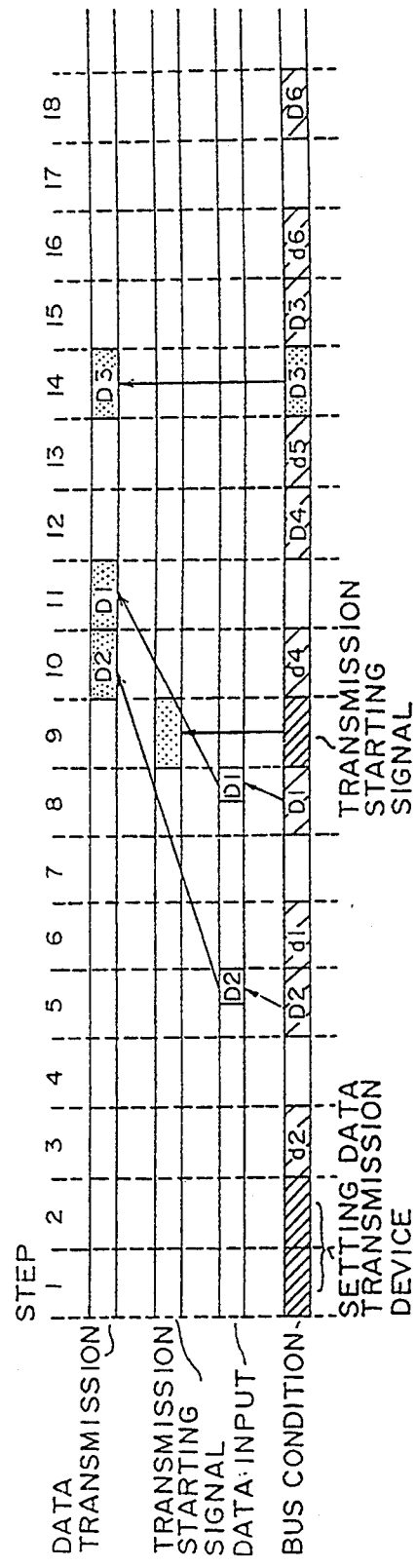

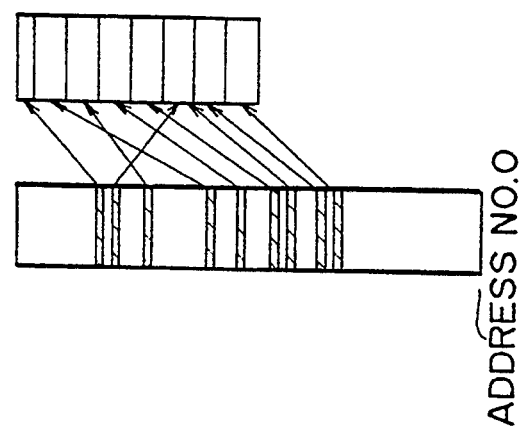
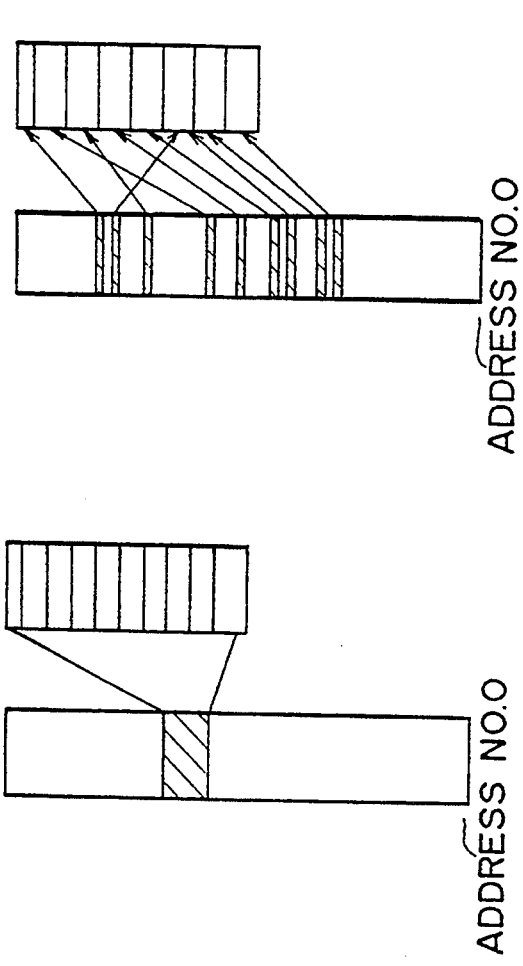
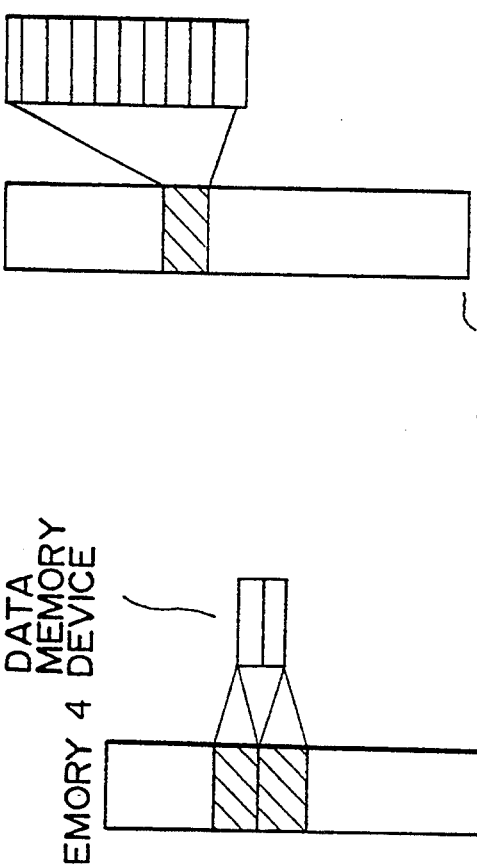

DATA TRANSMISSION SYSTEM WHICH PREFETCHES DATA TO BE TRANSFERRED

This application is a continuation of now abandoned application, Ser. No. 07/690,254, filed on Apr. 23, 1991.

BACKGROUND OF THE INVENTION

1. Field of the Invention

The present invention relates to a data transmission device, and in particular to a data transmission device for use in a computer system and the like.

2. Description of the Prior Art

In a data processing system having a processor, memory unit and data transmission device connected to each other via the same bus lines, in the case where data is processed and produced by the processor and is transmitted to an external portion through the data transmission device, two methods of data transmission have been employed in the prior art.

As the first method of data transmission, the processor transfers the data from the memory to a buffer provided in the data processing system by executing an instruction. In the first method of data transmission, since the processor directly contributes to the data transfer operation, the data processing operation in the processor is interrupted during the transfer operation performed by the processor, resulting in a deterioration of the efficiency of the entire system.

As the second method of data transmission, data is transferred directly from the memory unit to the buffer by a DMA (Direct Memory Access) function provided in the data transmission device when receiving an instruction from the processor. It is noted that the DMA function requires the use of special hardware for the direct transfer of data to or from memory to minimize the interruptions caused by program-controlled data transfers.

FIG. 1 shows a constitution of a conventional data transmission device utilizing the second data transmission method. A data transmission device 51 composed of a parameter memory unit 52 and address generating unit 53, is connected to an external destination 2 through external bus lines 5 for use in common with the processor 3 and memory unit 4.

The operation of the data transmission device utilizing the second method is described below with reference to FIG. 1.

First, a plurality of unprocessed data is read out from the memory 4 and the read out data is processed by the processor 3. The data processed by the processor 3 is written into the memory 4.

Next, the processor 3 sets the parameter memory unit 52 and sends a data transmission starting instruction to the data transmission device 51 for starting data transmission. In the data transmission device 51, an address is produced by the address generator 53 using the storage value of the parameter memory unit 52 set by the processor 3. Subsequently, the data transmission device 51 gains access to the memory unit 4, so that the data read out from the memory unit 4 is transmitted to the external destination 2 through the data transmission device 51.

FIG. 2 shows a timing chart for explaining the operation of the conventional data transmission device shown in FIG. 1. It is assumed that, the data to be transmitted to the external destination 2 consists of three pieces of data D1, D2 and D3 arranged in series in the memory 4; the data D1, D2 and D3 are transmitted in this order, wherein the data D3 is previously stored in the memory 4.

As shown in FIG. 2, in the first processing step 1 the processor 3 reads unprocessed (or not yet processed) data d2 to be processed therein from the memory 4, and in the step 2 the processor 3 processes the data d2 read therein and produces the processed data D2. In the step 3 the processor 3 writes the data D2 into the memory 4. In the steps 4, 5 and 6, in a manner similar to that of steps 1, 2 and 3, unprocessed data d1 is read into the processor 3 and is processed in the processor 3, so that the processed data D1 is produced by the processor 3 and is written into the memory 4. With the completion of the process in the step 6, the processed data D1, D2 and D3 to be transmitted to the external destination 2 are provided in the memory 4 arranged in the order of D1, D2 and D3 in series; the processor 3 sets the value of the data transmission device 51 in the steps 7 and 8, and subsequently the processor 3 transmits the data transmission starting signal to the data transmission device 51 in the step 9.

In the step 10, the processor 3 reads another piece of unprocessed data d4 to be processed therein from the memory 4, and then the data transmission device 51 attempts to gain access to the memory 4 and to read the processed data D1 to be first transmitted. However, since the external bus 5 is being used by the processor 3, the data D1 written in the memory 4 can not be read out by the data transmission device 51.

In the step 11, the unprocessed data d4 is processed by the processor 3 so as to produce the processed data D4 therefrom. Since the processor 3 releases the external bus 5, it becomes possible for the data transmission device 51 to gain access to the memory 4, so that the data D1 is read into the data transmission device 51 and is transmitted to the external destination 2 through the data transmission device 51.

In the step 12, the processor 3 writes the produced data D4 into the memory 4, and subsequently, the data transmission device 51 attempts to gain access to the memory 4 and to read in the data D2 to be transmitted next. However, since the external bus 5 is being used by the processor 3, the data D2 can not be read in the data transmission device 51.

The processes in the steps 13, 14 and 15 and in the steps 16, 17 and 18 are similar to those of steps 10, 11 and 12. In the step 14 the data D2 can be transmitted to the external destination 2, and in the step 17 the data D3 can be transmitted to the external destination 2, whereby the transmission of the data D1, D2 and D3 is completed in the step 17.

However, in such a conventional data processing system, in general, only when the external bus 5 is released from the processor 3, does it become possible for the data transmission device to gain access to the memory to transmit data to an external destination. When the processor releases the bus at a high frequency, in other words, when the frequency of use of the bus for access to the memory is low, since the data is transmitted to the external destination by way of the data transmission device during the period of releasing the bus, the data transmission time overlaps the effective time of the processor to gain access to the memory. On the other hand, when the frequency of use for access to the memory by the processor is such high in such a case where an operation of numeric values is executed so that the bus is not released by the processor, it is difficult to prevent an overlap between the data transmission time and the data processing effective time.

SUMMARY OF THE INVENTION

It is, therefore, an essential object of the present invention to provide a data transmission device enabling the transmission of data at a high speed with high efficiency without interrupting a process executed by a processor even in the case where the processor releases a bus at a low frequency.

In order to attain the object mentioned above, in a data processing system of the present invention, a data transmission device on a common external bus is connected to an external memory for storing data and is also connected to a processor for processing the data stored in the memory on the common bus, so that the data is transmitted to an external destination by way of the data transmission device in accordance with an instruction sent from the processor to the data transmission device. The data transmission device includes: a data conduct device for detecting the bus; a data memory device for storing the data to be transmitted to the external destination; and further includes a bus control unit for writing the data read out from the external memory into the data memory device, wherein the data conduct device detects the bus before starting data transmission. When the data to be transmitted appears onto the bus, a write-execution signal is transmitted to the bus control unit from the data conduct device, so that the data on the bus is written into the data memory device. In the period when the data is transmitted to the external destination, in the case where the data to be transmitted is stored in the data memory device, the data is transmitted from the data memory device to the external destination.

According to a feature of the data transmission device of the present invention, the data on the bus to be transmitted is fetched through the bus control unit and is previously stored in the data memory device in the data transmission device before starting data transmission, and when the data transmission is started, the data stored in the data memory device is transmitted to the external destination. Since the data previously stored in the data memory device can be fetched without accessing the external memory through the bus, a high data transmission rate can be obtained even in the case where the data transmission device is allowed to use the bus at a low frequency of use.

The features of the present invention which are believed to be novel are set forth with particularity in the appended claims. The present invention together with further objects and advantages thereof may best be understood with reference to the following detailed description, taken in conjunction with the accompanying drawings.

BRIEF DESCRIPTION OF THE DRAWINGS

FIG. 2 is a timing chart for explaining the operation of the conventional data transmission device shown in FIG. 1 according to prior art, FIGS. 4(a) and 4(b) are schematic diagrams each showing a transmission region in the memory 4 according to the first and third embodiments of the present invention, FIG. 5 is a timing chart for explaining the operation of the data transmission device according to the present invention, FIG. 7 is a schematic diagram showing a transmission region in the memory 4 according to the second embodiment of the present invention.

DETAILED DESCRIPTION OF THE PREFERRED EMBODIMENT

Figure 1:
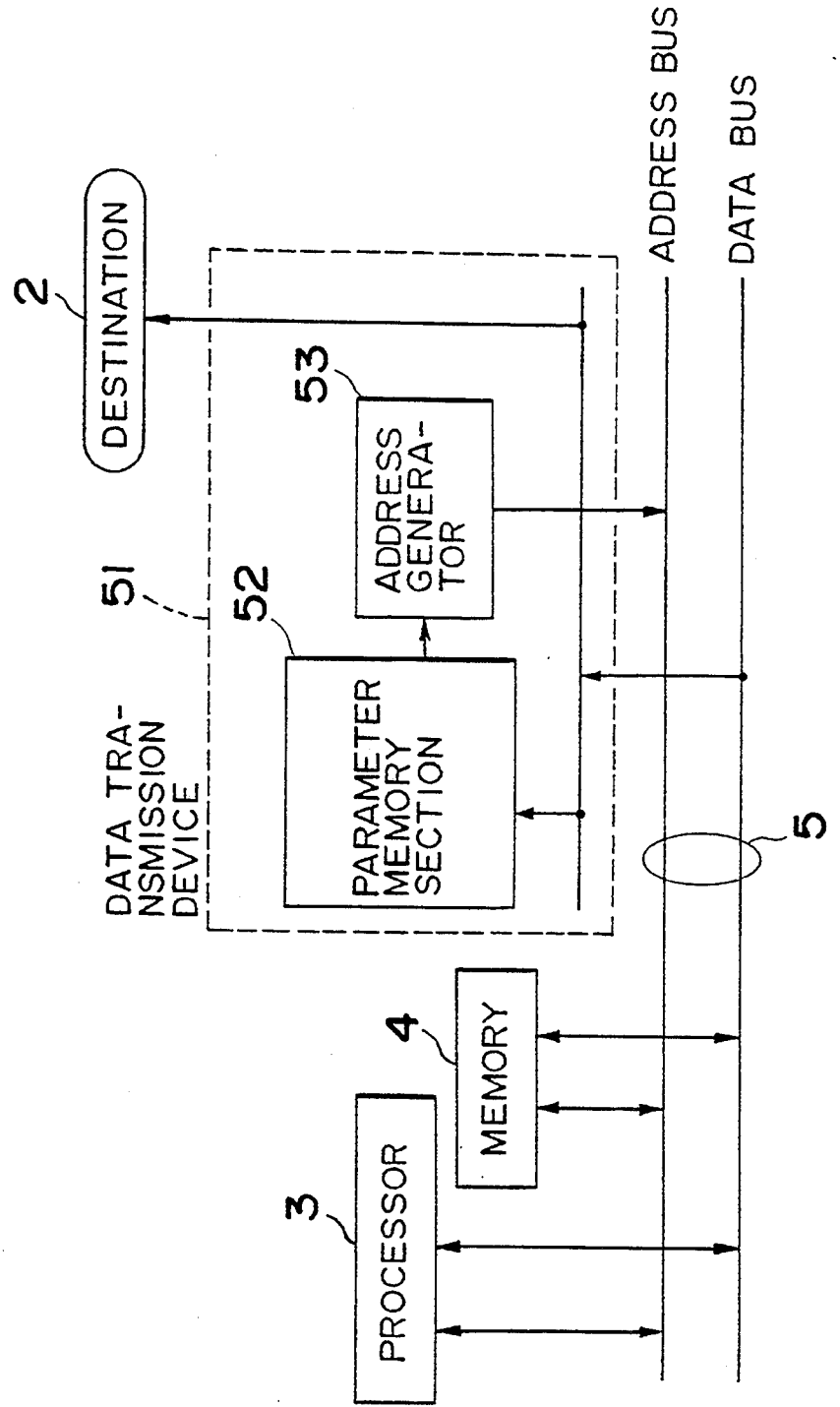
FIG. 1 is a block diagram showing a constitution of a conventional data transmission device according to prior art.
Figure 3:
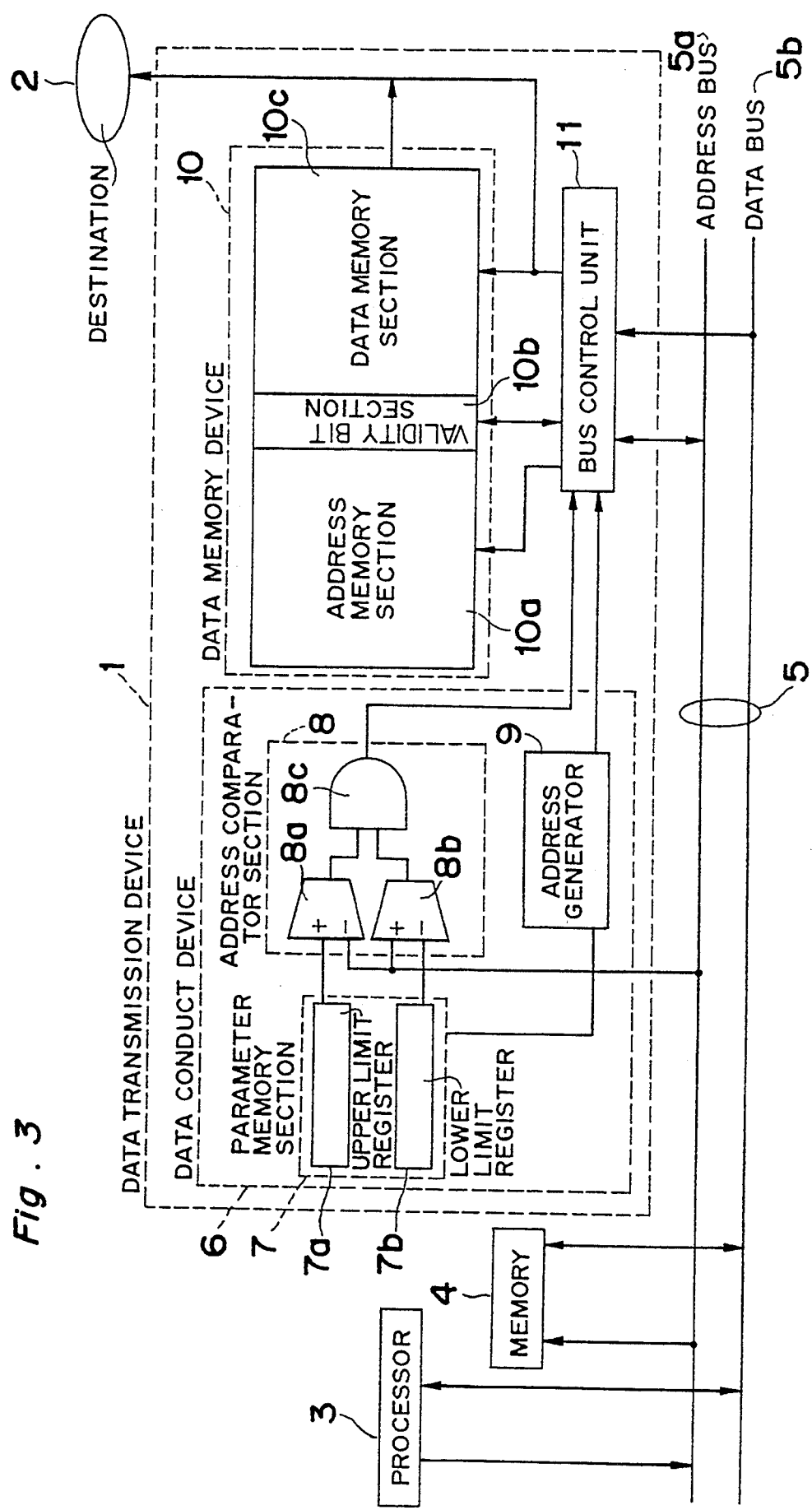
FIG. 3 is a block diagram showing a constitution of a first embodiment of a data transmission device according to the present invention.

FIG. 3 shows a constitution of a first preferred embodiment of a data transmission device according to the present invention.

As shown in FIG. 3, a data transmission device 1 having an external destination 2 connected thereto, a processor 3 and an external memory 4 are connected in parallel via a common external bus 5 consisting of an address signal line (bus) 5a and a data signal line (bus) 5b.

The data transmission device 1 consists of a data conduct device 6, a data memory device 10 and a bus control unit 11. The data conduct device 6 judges the external bus 5 whether or not data to be transmitted to the external destination 2 appears on the bus 5 in the period before the data transmission is started and for producing an address of the data to be transmitted which is assigned in the external memory 4 using a parameter stored in the data conduct device 6 when the data is transmitted to the external destination. The data memory device 10 is provided for storing the address of the data to be transmitted which is assigned in the external memory 4, the value of the data to be transmitted and storing the valid bid representing the validity of the data in the period before starting the data transmission. The bus control unit 11 is provided for writing the data appearing on the bus 5 into the data memory device 10 and for accessing to the external memory 4 for obtaining a data corresponding to the address produced by the data conduct device 6 in the period before starting the data transmission.

The output of the data conduct device 6 connected to the address signal line 5a is applied to the bus control unit 11. The bus control unit 11 connected to the address and data signal lines 5a and 5b is directly connected to the data memory device 10, and is directly connected to the external destination 2. The data memory device 10 is also directly connected to the external destination 2.

The data conduct device 6 consists of a parameter memory section 7 for storing the range of the data to be transmitted, an address comparator section 8 for comparing the output values of the parameter memory section 7 with the value of data on the address signal line 5a and for judging whether or not the data on the external bus 5 is to be transmitted, and an address generator 9 for producing an address of data to be transmitted which is assigned in the external memory 4 depending on the output value of the parameter memory section 7.

The parameter memory section 7 is composed of a pair of upper and lower limit registers 7a and 7b for registering the upper and lower limit values of the address of the data to be transmitted which is assigned in the external memory 4 respectively.

The address comparator section 8 is composed of a pair of comparators 8a and 8b for respectively comparing the output value of the upper limit register 7a with the value of the data on the address signal line 5a and for comparing the output value of the lower limit register 7b with the value of the data on the address signal line 5a, and is also composed of an AND circuit 8c to which the output signals of the comparators 8a and 8b are supplied.

The data memory device 10 consists of an address memory section 10a for storing the address of the data to be transmitted which is allocated in the external memory 4, a data memory section 10c for storing the value of the data to be transmitted, and a validity bit section 10b for storing a validity bit representing the validity the data.

As an example of such a data memory device 10, there is employed an associative memory (or content-addressed memory) such as memory means used in a direct map type cache device. That is to say, with respect to an address number assigned by a lower value of the address, the upper value of the address is stored in the address memory section 10a, and the value of the data to be transmitted is stored in the data memory section 10c, and the validity bit assigned to the corresponding address in the validity bit 10b represents the validity of the data. The judgment whether or not the address produced by the address generator 9 is stored in the address memory section 10a is performed in such a manner that, using the value anterior to the address produced by the address generator 9 as an address, the value of the data read out from the address memory section 10a is compared with the value posterior to the address produced by the address generator 9 and when both of the values are equal to each other, it is judged that the address produced by the address generator 9 is present in the address memory section 10a.

FIG. 4(a) shows the relationship between the areas of the data to be transmitted allocated in the external memory 4 and the areas of the data stored in the memory device 10. In this preferred embodiment, when two or more pieces of data to be transmitted are assigned to one address of the data memory device 10, the data to be stored later is regarded to be valid and is superscribed on the data previously stored in the address of the data memory device 10. Therefore, as the capacity of the data memory device 10, it is not required to secure the capacity corresponding to that of the memory area storing the data to be transmitted in the external memory 4, and it is sufficient to secure some range of the areas of the external memory 4 in the data memory device 10.

In the data transmission device 1, before the data transmission is started, the data conduct device 6 judges the external bus 5 and the address comparator section 8 provided therein compares the value of the data on the address signal line 5a with the output values of the parameter memory section 7. As the result of the comparison, when it is judged that both of the values are equal, in other words, that the data to be transmitted appears on the external bus 5, the address comparator section 8 transmits a write-execution signal to the bus control unit 11 so that the bus control unit 11 writes the data appearing on the external bus 5 into the data memory section 10c together with the validity bit thereof into the validity bit section 10b in the data memory device 10. In the period of data transmission, when it is judged that the data assigned to the address produced by the address generator 9 is present in the data memory device 10, the data corresponding to the address is transmitted to the external destination 2 by way of the data memory section 10c, and on the other hand, when it is judged that the data assigned to the address produced by the address generator 9 is absent in the data memory device 10, the bus control unit 11 gains access to the external memory 4 for obtaining the data corresponding to the address produced by the address generator 9, so that the data obtained from the external memory 4 is transmitted to the external destination 2 through the bus control unit 11.

FIG. 5 shows a timing chart for explaining the operation of the first embodiment of the data transmission device shown in FIG. 3. It is assumed that the data to be transmitted to the external destination 2 are D1, D2 and D3 which are serially allocated in the external memory 4 and are transmitted in the order of D1, D2 and D3, wherein the third piece of data D3 has been previously stored in the memory 4.

In the steps 1 and 2, the processor 3 sets the data transmission device 1 to be initialized. More in detail, the processor 3 sets the upper limit register 7a with the upper limit value of the address of the data to be transmitted (i.e., the address of the data D3) and sets the lower limit register 7b with the lower limit value of the address of the data to be transmitted (i.e., the address of the data D1) and then the validity bit stored in the validity bit section 10b in the data memory device 10 is cleared, so that the comparison between the output values of the parameter memory section 7 and the value of the data on the address signal line 5a is started by the address comparator section 8 in the data conduct device 6.

In the step 3, the processor 3 reads a data d2 to be processed from the external memory 4, and subsequently in the step 4 the processor 3 processes the data d2 so as to produce the data D2. In the step 5 the processor 3 writes the processed data D2 into the external memory 4. In this process of the data transmission device 1, the address comparator section 8 compares the value of the data on the address signal line 5a with the output values of the parameter memory section 7. When it is judged that the data D2 is to be transmitted, the data conduct device 6 transmits a write-execution signal to the bus control unit 11. In the step 5, in response to receiving the write-execution signal transmitted from the data conduct device 6, the bus control unit 11 writes the value of the data on the data signal line 5b into the address assigned by the value anterior to the address of the processed data D2 in the data memory section 10c of the data memory device 10, and the bus control unit 11 also writes a value posterior to the address of the data D2 into the address memory section 10a, and also the validity bit representing the validity of the data D2 is written in the validity bit section 10b.

The processes in the steps 6, 7 and 8 are for processing the data d1 to produce the data D1 in a manner similar to that of steps 3, 4 and 5, and the data D1 to be transmitted is stored into the data memory device 10 and is allocated to the address assigned by the value anterior to the address of the data D1 in the data memory section 10c, and a value posterior to the address of the data D1 is written into the address memory section 10a, and the validity bit representing the validity of the data D1 is written in the validity bit section 10b.

In the step 9, since the data D1, D2 and D3 to be transmitted have been stored in the external memory 4, the processor 3 sends a data transmission starting signal to the data transmission device 1, so that the data transmission device 1 starts the data transmission operation. More in detail, the address generator 9 starts producing the address in the range from the value registered in the lower limit register 7b to the value registered in the upper limit register 7a. When there is stored an address corresponding to the range of the addresses produced by the address generator 9 in the address memory section 10a with the validity bit representing the validity of the data in the validity bit section 10b, the data is transmitted to the external destination 2 by way of the data memory section 10c.

When the address corresponding to the range of the addresses produced by the address generator 9 is not stored in the address memory section 10a, the bus control unit 11 accesses to the external memory 4 for obtaining a data corresponding to the address produced by the address generator 9, and the obtained data fetched from the memory 4 is transmitted to the external destination 2 through the bus control unit 11.

In the step 10, a new piece of data d4 to be processed is fetched from the external memory 4 into the processor 3. While in the data transmission device 1, the address of the data D1 is produced by the address generator 9 so as to be written in the address memory section 10a in the step 8 and the validity bit representing the validity of the data D1 is stored in the validity bit section 10b, and the data D1 stored in the data memory device 10 is transmitted to the external destination 2 by way of the data memory section 10c.

In the step 11 the processor 3 processes the data d4 read out of the memory 4 and produces a processed data D4. While in the data transmission device 1, the address of the data D2 is produced by the address generator 9. The address of the data D2 has been previously written in the address memory section 10a in the step 5 and the validity bit representing the validity of the data D2 is present in the validity bit section 10b, and the data D2 stored in the data memory device 10 is transmitted to the external destination 2 by way of the data memory section 10c.

In the step 12, the processor 3 writes the processed data D4 into the external memory 4 and the address of the data D3 is produced by the address generator 9 in the data transmission device 1. However, since the address of the data D3 is not stored in the address memory section 10a, the bus control unit 11 attempts to gain access to the memory 4 for obtaining the data D3. But since the external bus 5 is in use for the processor 3 writing the data D4 into the memory 4, the bus control unit 11 can not gain access to the memory 4 for fetching the data D3 to be transmitted.

In the step 13, the processor 3 reads a new piece of data d5 to be processed therein from the memory 4, and the bus control unit 11 attempts to gain access to the memory 4 depending on the address of the data D3. But since the external bus 5 is in use for the processor 3 writing the data D5 into the memory 4, the access to the memory 4 for obtaining the data D3 can not be executed.

In the step 14, the processor 3 processes the unprocessed data d5 and produces a data D5. In the data transmission device 1, since the external bus 5 is released from the use by the processor 3, the bus control unit 11 can gain access to the memory 4 depending on the address of the data D3, and the data D3 obtained from the memory 4 is transmitted to the external destination 2 by way of the bus control unit 11. In this way, in the data transmission device according to the present invention, the transmission processes for transmitting the data D1, D2 and D3 are completed by executing the processes in the steps 1 to 14.

As described above, while in the conventional data transmission device, it is required to process from the steps 1 to 17 for transmitting the data D1, D2 and D3 to the external destination 2, on the other hand, according to the preferred embodiment of the data transmission device, the process for transmitting the data D1, D2 and D3 can be completed by performing the processes in the steps 1 to 14.

According to a feature of the first preferred embodiment, the data transmission device 1 detects the data on the external bus 5 and a part or all of the data to be transmitted is previously stored in the data transmission device 1 and only the data remaining in the external memory 4 is obtained by accessing to the external memory 4, whereby the obtained data can be transmitted to the external destination 2 at a low frequency of use of the external bus 5. Moreover, even in the case where the data transmission device 1 gains a low frequency of use of the external bus 5, a high data transmission efficiency can be obtained. And since the processor 3 gains the use of the external bus 5 without so much interruption by the data transmission device 1, the deterioration of the efficiency of the processor 3 due to the data transmission can be avoided.

Moreover, since the data transmission device 1 is provided with the data memory device 10 and address generator 9, even though the data to be transmitted are not fetched on the external bus 5 in the order to be transmitted, the data can be transmitted to the external destination 2 in the right order of the data. Also, in the case where data beyond the capacity of the data memory device 10 are transmitted, by providing the address memory section 10a in the data memory device 10, the presence or absence of a data to be transmitted in the data transmission device 1 can be detected by detecting the address written in the address memory section 10a in the data memory device 10, thereby eliminating the problem pointed out in the conventional data transmission device.

In addition, although the address generator 9 produces an address by increasing from the lower limit value registered in the lower limit register 7b to the upper limit value registered in the upper limit register 7a one by one, on the contrary to this example, the address may be produced by decreasing from the upper limit value registered in the upper limit register 7a to the lower limit value registered in the lower limit register 7b one by one.

In addition, by increasing the parameters stored in the parameter memory section 7, it is not required to limit the indication of data transmission to the range of the addresses, and the indication of the data transmission may be performed by a complicated address pattern such as only the add or even numbers of the addresses assigned in the external memory 4.

Figure 6:
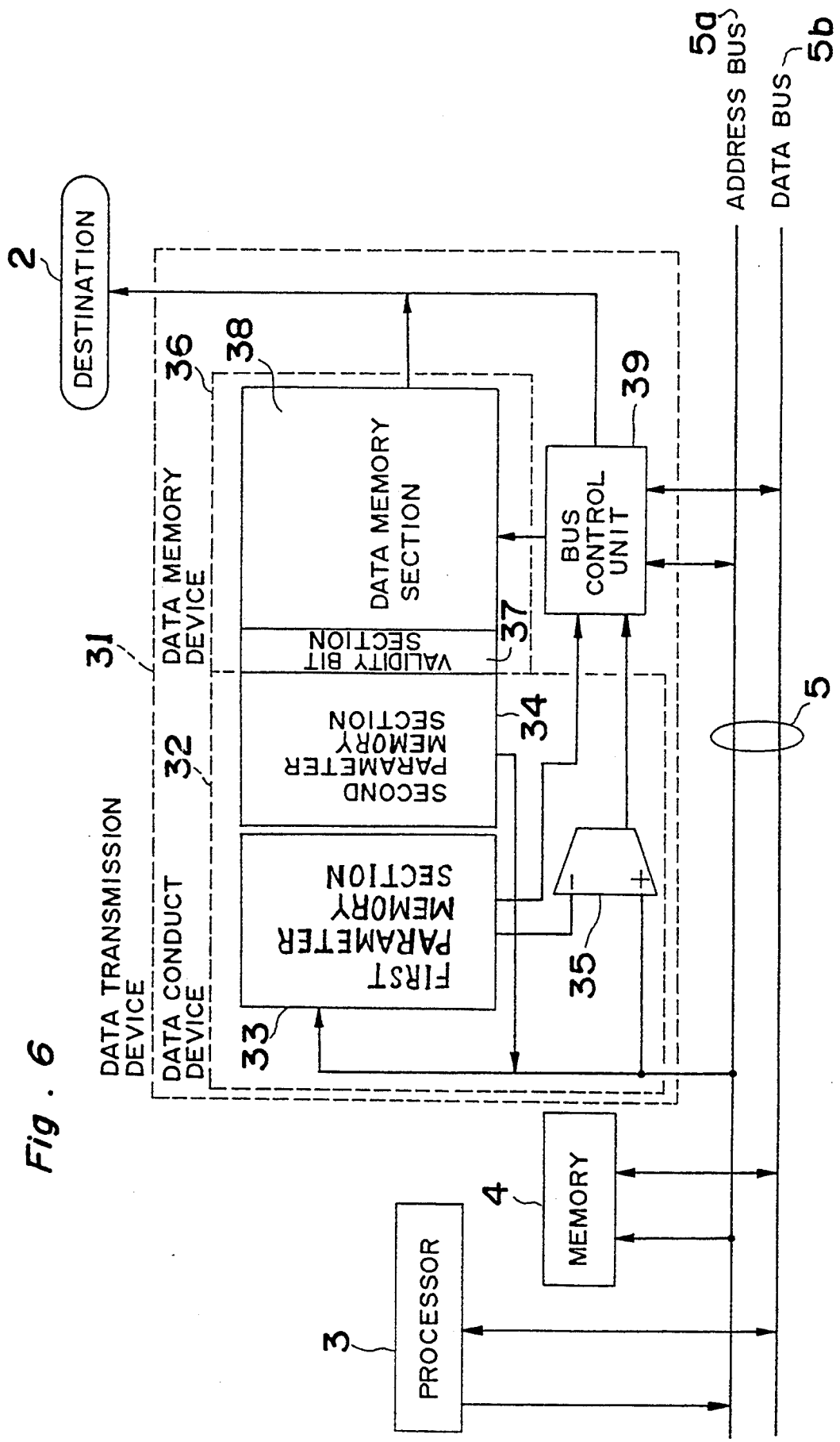
FIG. 6 is a block diagram showing a constitution of a second embodiment of a data transmission device according to the present invention.

FIG. 6 shows a constitution of a second preferred embodiment of a data transmission device according to the present invention.

In this second embodiment having a structure similar to that of the first embodiment, a data transmission device 31 connected to an external destination 2, a processor 3 and an external memory 4 are connected in parallel via a common external bus 5 composed of an address signal line 5a and data signal line 5b. The data transmission device 31 consists of a data conduct device 32, a data memory device 36 and a bus control unit 39.

The output signal of the data conduct device 32 which is connected to the address signal line 5a is applied to the bus control unit 39 which is connected to the external bus 5. The bus control unit 39 is connected to the data memory device 36 and is also directly connected to the external destination 2. The output signal of the data memory device 36 is applied to the external destination 2.

The data conduct device 32 comprises a first parameter memory section 33 for registering an address value posterior to that of the data to be transmitted and the data transmission order, a second parameter memory section 34 for registering an address value anterior to that of the data to be transmitted, and an address comparator section 35 for detecting an address of the data on the address signal line 5a by comparing the address of the data to be transmitted with the value of the data on the address signal line 5a. In this second preferred embodiment, a direct map type cache device is employed as an example of such a first parameter memory section 33. That is to say, the value of the portion posterior to the address read out from the first parameter memory section 33 depending on the value anterior to the address on the address signal line 5a is compared with the value posterior to the address on the address signal line 5a by the address comparator section 35, so as to thereby detect whether or not both of the values are coincident.

The data memory device 36 comprises a validity bit section 37 for storing the validity bit representing the validity of the data to be transmitted, and a data memory section 38 for storing the data to be transmitted having its memory areas each corresponding to each of the areas of the parameter memory section 34.

In the second embodiment, each address of the data to be transmitted is registered in both of the first and second parameter memory sections 33 and 34, whereas in the first embodiment the upper limit and lower limit values of the address of the data to be transmitted assigned in the memory 4 are registered in the parameter memory section 7. Therefore, although the amount of data to be transmitted at the same time is limited within the range of the capacity of the second parameter memory section 34, the data to be transmitted may be assigned to random pattern addresses as shown in FIG. 7 in accordance with the transmission order of the data stored in the first parameter memory section 33, wherein such random pattern addresses can not be produced by the address generator 9 in the first embodiment.

In this embodiment, the data transmission process performed by the data transmission device 31, which is similar to that of the first embodiment, is explained with reference to FIGS. 5 and 6. It is assumed that three data D1, D2 and D3 are transmitted to the external destination 2 in the order of D1, D2 and D3, wherein the data D3 have been previously stored in the external memory 4.

In the steps 1 and 2, the processor 3 sets the data transmission device 31 to be initialized. More in detail, in the first parameter memory section 33, there are stored values posterior to the addresses of the data D1, D2 and D3 and numbers 1, 2 and 3 representing the data transmission order thereof with the addresses of the values anterior to the addresses of the data D1, D2 and D3 respectively, so that the values anterior to the addresses of the data D1, D2 and D3 are respectively written in the address numbers 1, 2 and 3 in the second parameter memory section 34.

Then, in the data transmission device 31, the contents stored in the valid bid section 37 of the data memory device 36 are cleared and the first parameter memory section 33 starts the detection of the data on the address signal line 5a.

In the next step 3 the processor 3 reads a data d2 to be processed from the external memory 4, and processes the data d2 so as to produce a processed data D2 in the step 4.

In the step 5 the processor 3 writes the processed data D2 into the memory 4. In this operation of the data transmission device 31, when the address comparator section 35 judges that the data D2 is to be transmitted, the bus control unit 39 fetches the data on the data signal line 5b into the address indicated by the data transmission order read out from the first parameter memory section 33, (i.e., in the address number 2) in the data memory section 38, and the valid bid representing the validity of the data D2 is written in the valid bid section 37 in the data memory device 36.

The processes in the steps 6, 7 and 8 are for processing the data d1 to produce the data D1 in a manner similar to those in the steps 3, 4 and 5, and the data D1 to be transmitted is stored into the data memory device 36, and the validity bit representing the validity of the data D1 is written in the validity bit section 37.

In the step 9, since the data D1, D2 and D3 to be transmitted have been stored in the external memory 4, the processor 3 sends a data transmission starting signal to the data transmission device 31, so that the data transmission device 1 starts the data transmission operation. More in detail, in the case where the validity bit representing the validity of the data is present in the validity bit section 37, the number of data corresponding to the number of the addresses stored in the second parameter memory section 34 are serially transmitted to the external destination 2 by way of the data memory section 38 in the order starting from the address number 1 in the data memory device 36. In the case where the validity bit representing the validity of the data is not present in the validity bit section 37, the value posterior to the address of the data is read out from the first parameter memory section 33 in correspondence with the value stored in the second parameter memory section 34, so that the address of the data is produced depending on the read out posterior value and the value of the second parameter memory section 34, whereby the bus control unit 39 gains access to the external accesses to the external memory 4 for obtaining a data corresponding to the produced address, and the obtained data fetched from the memory 4 is transmitted to the external destination 2 through the bus control unit 39.

In the step 10, a new data d4 to be processed is fetched from the external memory 4 and fed into the processor 3. While in the data transmission device 1, the validity bit representing the validity of the data D1 assigned to the address number 1 in the data memory device 36 is present in the validity bit section 37, and the data D1 stored in the data memory device 36 is transmitted to the external destination 2 by way of the data memory section 38.

In the step 11 the processor 3 processes the data d4 read out from the memory 4 and produces a processed data D4. While in the data transmission device 1, the validity bit representing the validity of the data D2 assigned to the address number 2 in the data memory device 36 is present in the validity bit section 37, and the data D2 stored in the data memory device 36 is transmitted to the external destination 2 by way of the data memory section 38.

In the step 12, the processor 3 writes the processed data D4 into the external memory 4. While in the data transmission device 1, the validity bit representing the validity of the data D3 assigned to the address number 3 in the data memory device 36 is not present in the validity bit section 37, and the value posterior to the address of the data is read out from the first parameter memory section 33 depending on the value assigned to the address number 3 in the second parameter memory section 34, so that the address of the data is produced depending on the read out posterior value and the value of the second parameter memory section 34, whereby the bus control unit 39 attempts to gain access to the memory 4 for obtaining the data D3. But since the external bus 5 is in use for the processor 3 writing the data D4 into the memory 4, the bus control unit 39 can not gain access to the memory 4 for fetching the data D3 to be transmitted.

In the step 13, the processor 3 reads a new data d5 to be processed therein from the memory 4, and the bus control unit 39 attempts to gain access to the memory 4 depending on the address of the data D3. But since the external bus 5 is in use for the processor 3 writing the data D5 into the memory 4, the access to the memory 4 for obtaining the data D3 can not be executed.

In the step 14, the processor 3 processes the unprocessed data d5 and produces a processed data D5. In the data transmission device 1, since the external bus 5 is released from the use by the processor 3, the bus control unit 39 can gain access to the memory 4 depending on the address of the data D3, and the data D3 obtained from the memory 4 is transmitted to the external destination 2 by way of the bus control unit 39. In this way, in the data transmission device according to the present invention, the transmission processes for transmitting the data D1, D2 and D3 are completed by executing the processes through the steps 1 to 14.

As described above, while in the conventional data transmission device, it is required to complete the processes through the steps 1 to 17 for transmitting the data D1, D2 and D3 to the external destination 2, on the other hand, according to the preferred embodiment of the data transmission device, the process for transmitting the data D1, D2 and D3 can be completed by performing the processes through the steps 1 to 14.

According to a feature of the second preferred embodiment, which is similar to the first embodiment, the data transmission device 31 detects the data on the external bus 5 and a part or all of the data to be transmitted is previously stored in the data transmission device 31, and only the data remaining in the external memory 4 is obtained by accessing to the external memory 4, whereby the obtained data can be transmitted to the external destination 2 at a low frequency of use of the external bus 5. Moreover, even in the case where the data transmission device 31 is allowed to use the external bus 5 at a low frequency of use, a high data transmission efficiency can be obtained. And since the processor 3 is allowed to use the external bus 5 without so much interruption by the data transmission device 31, the deterioration of the efficiency of the processor 3 due to the data transmission can be avoided.

Moreover, in the second embodiment, in comparison to the first embodiment, although the volume of data transmittable at one time is limited due to the volumes of the second parameter memory section 34 and data memory device 36, there is an advantage that, when the volume of the data to be transmitted is within a predetermined range, the data can be transmitted in accordance with a random address pattern.

In addition, in this embodiment, in the process before starting the data transmission, although the processor 3 sets the first and second parameter memory sections 33 and 34 in detail, it is possible to constitute the data transmission device 31 in such a manner that only the address is fed to the data transmission device 31 by the processor 3 and the details thereof in the data conduct device 32 can be set by a process in the data transmission device.

In addition, in this embodiment, although, in the process before starting the data transmission, when it is judged that the data to be transmitted appears on the data bus 5, in other words, when the first parameter memory section 33 detects the coincidence of the address values, the bus control unit 39 fetches the data on the data signal line 5b and writes the data into the data memory section 38 onto the address representing the order of data transmission sent from the first parameter memory section 33 with the valid bid set in the valid bid section 37; however, the invention is not limited to this.

Subsequently in the data transmission operation, although, in the case where the data assigned to the address in the second parameter memory section 34 is present in the data memory device 36, the data is transmitted from the data memory section 38 to the external destination 2, and in the case where the data assigned to the address in the second parameter memory section 34 is not present in the data memory device 36, the bus control unit 39 accesses to the the external memory 4 to obtain the the data corresponding to the address so that the obtained data is transmitted to the external destination 2 through the bus control unit 39, however, the invention is not limited to this. That is to say, it may be possible to constitute the data transmission device in such a manner that, in the process before starting the data transmission, when it is judged that the data to be transmitted appears on the data bus 5, the bus control unit 39 fetches the data on the data bus and writes the data into the data memory section 38 onto the address anterior to the value on the address signal line together with the valid bid of the data to be written into the valid bid section 37, and in the data transmission process, in the case where the data assigned to the address in the second parameter memory section 34 is present in the data memory device 36, the data is transmitted to the external destination from the data memory section 38 in accordance with the data transmission order, and in the case where the data assigned to the address in the second parameter memory section 34 is not present in the data memory device 36, the bus control unit 39 accesses to the external memory 4 to obtain the data corresponding to the address so that the obtained data is transmitted to the external destination through the bus control unit 39.

Figure 8:
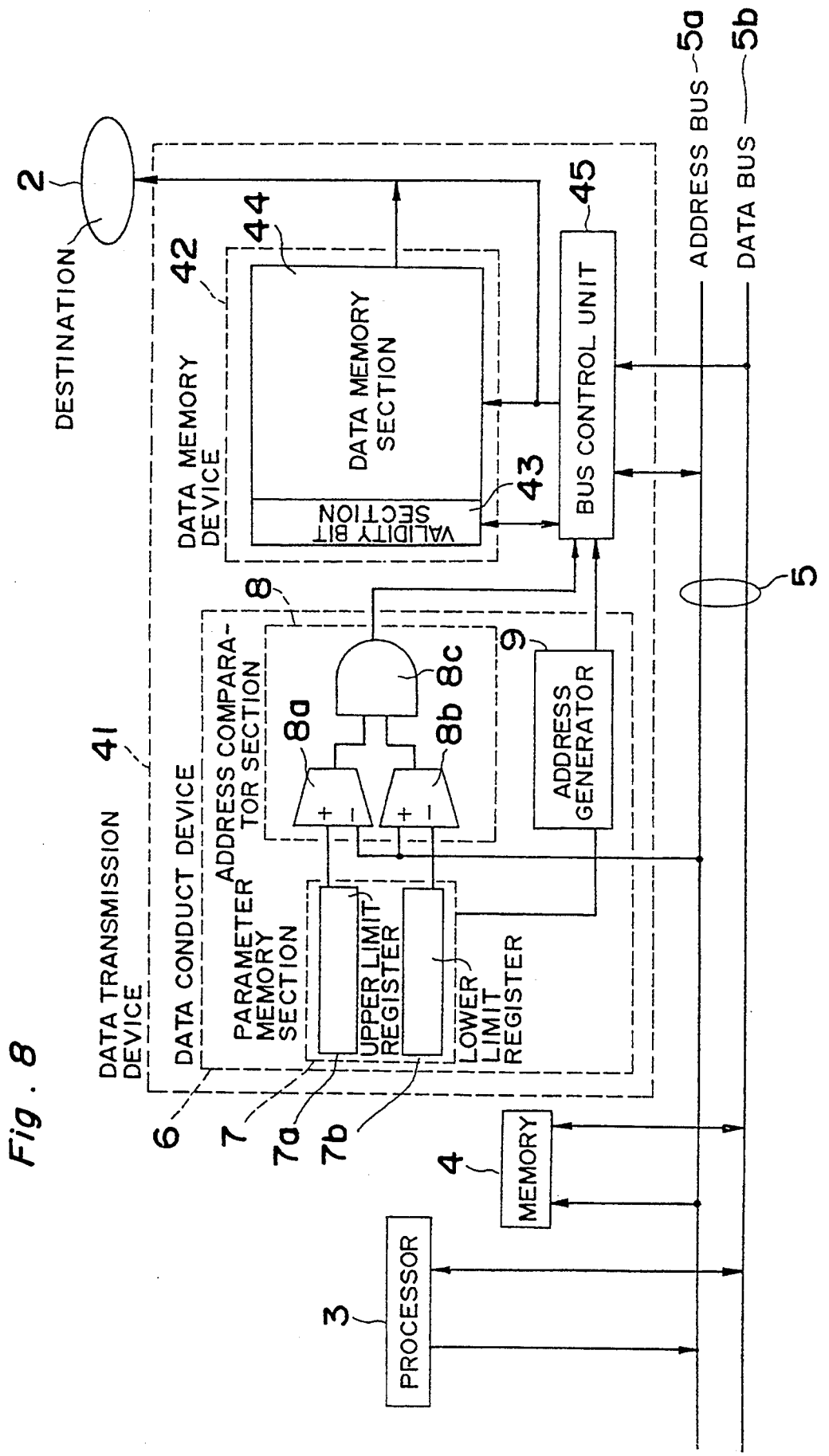
FIG. 8 is a block diagram showing a constitution of a third embodiment of a data transmission device according to the present invention.

FIG. 8 is a block diagram showing a third embodiment of a data transmission device according to the present invention.

In a fashion similar to that of the first embodiment, a data transmission device 41 is connected to an external data destination 2, a processor 3 and an external memory 4 are connected to an external common bus 5 composed of a pair of address signal line 5a and data signal line 5b. The data transmission device 41 comprises a data conduct device 6, data memory device 42 and bus control unit 45.

The output signal of the data conduct device 6 connected to the address signal line 5a is applied to the bus control unit 45. The bus control unit 45 connected to the address and data signal lines 5a and 5b is connected to the data memory device 42, and is also directly connected to the external destination 2. The data memory device 42 is also connected to the external destination 2.

The data conduct device 6 comprises a parameter memory section 7 for storing the range of the data to be transmitted, an address comparator section 8 for comparing the output values of the parameter memory section 7 with the value of data on the address signal line 5a, and an address generator 9 for producing an address of a data to be transmitted stored in the external memory 4, wherein the address of the data is generated depending on the output value of the parameter memory section 7.

The parameter memory section 7 is composed of a pair of upper and lower limit registers 7a and 7b for registering the upper and lower limit values of the address of the data to be transmitted stored in the external memory 4 respectively.

The address comparator section 8 comprises a pair of comparators 8a and 8b for respectively comparing the output value of the upper limit register 7a with the value of the data on the address signal line 5a and for comparing the output value of the lower limit register 7b with the value of the data on the address signal line 5a, and further comprises an AND circuit 8c for receiving the output signals of the comparators 8a and 8b.

The data memory device 42 comprises a data memory section 44 for storing the value of data to be transmitted and a validity bit section 43 for storing a bit of data of a validity bit representing the validity of the data. In the address NO. 1 of the data memory device 42, there is stored a data allocated to an address in the memory 4 which corresponds to the lower limit value represented by the lower limit register 7b. In the address NO. 2 of the data memory device 42, there is stored data allocated to an address +1 in the memory 4 adding 1 to the address represented by the lower limit register 7b. In the address NO. 3 of the data memory device 42, there is stored data allocated to an address +2 in the memory 4 adding 2 to the address represented by the lower limit register 7b, and in a similar manner, the data are stored up to the final or full number of the address in the data memory device 42.

In this third embodiment, the amount of hardware thereof is reduced by omitting the address memory section 10a for storing the address of the data in the memory 4 in the data memory section 44 although the address memory section 10a is provided in the first embodiment. However, the volume of the data to be transmitted at one time is limited to a volume less than the maximum volume of the data memory device 42 due to omission of the address memory section 10a.

FIG. 4(b) shows the relationship between the data transmission area in the memory 4 and the memory area in the data memory device 42. As shown in FIG. 4(b), the data memory device 42 in this embodiment secures the memory area corresponding to the transmission area in the memory 4, whereby the data stored only in a predetermined range of the area in the memory 4 are transmittable to the external destination 2.

Next, the operation of the data transmission device 41 in the third embodiment, which is similar to that of the first embodiment, will be explained with reference to FIGS. 5 and 8. It is assumed that the data to be transmitted to the external destination 2 are D1, D2 and D3 which are serially allocated in the external memory 4 and transmitted in the order of D1, D2 and D3, wherein the third data D3 has been previously stored in the memory 4.

In the steps 1 and 2, the processor 3 sets the data transmission device 1 to be initialized. More in detail, the processor 3 sets the upper limit register 7a with the upper limit value of the address of the data to be transmitted (i.e., the address of the data D3) stored in the memory 4 and sets the lower limit register 7b with the lower limit value of the address of the data to be transmitted (i.e., the address of the data D1) stored in the memory 4, and then the contents stored in the valid bid section 43 in the data memory device 42 are cleared, so that the comparison between the output values of the parameter memory section 7 and the value of the data on the address signal line 5a is started by the address comparator section 8 in the data conduct device 6.

In the step 3, the processor 3 reads the data d2 to be processed therein from the external memory 4, and subsequently in the step 4 the processor 3 processes the data d2 so as to produce the processed data D2.

In the step 5 the processor 3 writes the processed data D2 into the external memory 4. In this process of the data transmission device 1, the address comparator section 8 compares the value of the data on the address signal line 5a with the output values of the parameter memory section 7. When it is judged that the data D2 is to be transmitted, the data conduct device 6 transmits a write-execution signal to the bus control unit 45. In the step 5, in response to receiving the write-execution signal transmitted from the data conduct device 6, the bus control unit 45 writes the value of the data on the data signal line 5b into the data memory section 44 in the data memory device 42, and also the validity bit representing the validity of the data D2 is set in the validity bit section 43.

In this operation, the value +1 obtained by subtracting the lower limit value represented by the lower limit register 7b from the value of the address signal line 5a is utilized as the address in the data memory device 42. In the step 5, {(address of D2)−(lower limit value, i.e., address of D1)+1=address NO. 2} is utilized as the address in the data memory device 42 on which the data on the data signal line 5b is written and the validity bit of the data corresponding to the address NO. 2 is set in the validity bit section 43.

The processes in the steps 6, 7 and 8 are for processing the data d1 to produce the data D1 in a fashion similar to that of the steps 3, 4 and 5, and the data D1 to be transmitted is stored into the data memory device 42 and is allocated to the address NO. 1 thereof.

In the step 9, since the data D1, D2 and D3 to be transmitted have been stored in the external memory 4, the processor 3 sends a data transmission starting signal to the data transmission device 41, so that the data transmission device 41 starts the data transmission. More in detail, the address generator 9 starts producing the address in the range from the value registered in the lower limit register 7b to the value registered in the upper limit register 7a.

When the validity bit of the data corresponding to the addresses NOs. 1 to 3 is set in the validity bit section 43 in the data memory device 42, the data is transmitted to the external destination 2 from the data memory section 44 in the order starting from the address NO. 1 of the data memory device 42. That is to say, as for the data D1, when the validity bit corresponding to the address NO. 1 is set in the validity bit section 43 in the data memory device 42, the data transmission is started from the address NO.1 of the data memory section 44. As for the data D2, when the validity bit corresponding to the address NO. 2 is set in the validity bit section 43 in the data memory device 42, the data transmission is started from the address NO. 2. Similarly as for the data D3, when the validity bit corresponding to the address NO. 3 is set in the validity bit section 43 in the data memory device 42, the data transmission is started from the address NO. 3.

When the validity bit corresponding to the address is not set in the validity bit section 43, the bus control unit 45 accesses to the external memory 4 for obtaining a data corresponding to the address produced by the address generator 9, and the obtained data fetched from the memory 4 is transmitted to the external destination 2 through the bus control unit 45.

In the step 10, a new piece of data d4 to be processed is fetched from the external memory 4 into the processor 3. While in the data transmission device 41, the validity bit representing the validity of the data D1 corresponding to the address NO. 1 is set in the validity bit section 43 in the data memory device 42, and the data D1 stored in the data memory device 42 is transmitted to the external destination 2 by way of the data memory section 44.

In the step 11 the processor 3 processes the data d4 read out of the memory 4 and produces a processed data D4. While in the data transmission device 41, the validity bit corresponding to the address NO. 2 is set in the validity bit section 43 in the data memory device 42, and the data D2 stored in the data memory device 42 is transmitted to the external destination 2 by way of the data memory section 44.

In the step 12, the processor 3 writes the processed data D4 into the external memory 4. In the data transmission device 41, the validity bit corresponding to the address NO. 3 in the data memory device 42 is not set in the validity bit section 43, and the bus control unit 45 attempts to gain access to the memory 4 for obtaining the data D3. But since the external bus 5 is in use for the processor 3 writing the data D4 into the memory 4, the bus control unit 45 can not gain access to the memory 4 for fetching the data D3 to be transmitted.

In the step 13, the processor 3 reads a new data d5 to be processed therein from the memory 4, and the bus control unit 45 attempts to gain access to the memory 4 depending on the address of the data D3. But since the external bus 5 is in use for the processor 3 writing the data D5 into the memory 4, the access to the memory 4 for obtaining the data D3 can not be executed.

In the step 14, the processor 3 processes the data d5 and produces a processed data D5. In the data transmission device 41, since the external bus 5 is released from the use by the processor 3, the bus control unit 45 is allowed to gain access to the memory 4 depending on the address of the data D3, and the data D3 obtained from the memory 4 is transmitted to the external destination 2 by way of the bus control unit 45. In this way, in the data transmission device according to the present invention, the transmission processes for transmitting the data D1, D2 and D3 are completed by executing the processes through the steps 1 to 14.

As described above, while in the conventional data transmission device, it is required to process from the steps 1 to 17 for transmitting the data D1, D2 and D3 to the external destination 2, on the other hand, according to the preferred embodiment of the data transmission device, the process for transmitting the data D1, D2 and D3 can be completed by performing the processes through the steps 1 to 14.

According to a feature of the third preferred embodiment, the data transmission device, 41 detects the data on the external bus 5 and a part or all of the data to be transmitted is previously stored in the data transmission device 41 and only the data remaining in the external memory 4 is obtained by accessing to the external memory 4, whereby the data can be transmitted to the external destination 2 at a low frequency of use of the external bus 5. Moreover, even in the case where the data transmission device 41 is allowed to use the external bus 5 at a low frequency of use, a high data transmission efficiency can be obtained. And since the processor 3 is allowed to use the external bus 5 without so much interruption due to use by the data transmission device 41, the deterioration of the efficiency of the processor 3 during the process of the data transmission can be avoided.

Moreover, since the data transmission device 41 is provided with the data memory device 42 and address generator 9, even though the data to be transmitted are not fetched on the external bus 5 in the order to be transmitted, the data can be transmitted to the external destination 2 in the right order of the data transmission.

Moreover, in this third embodiment, comparing to the first embodiment, although the volume of data transmittable at one time is limited due to the volume of the memory area in the data memory device 42, there is an advantage that, in the case where the volume of the data to be transmitted is within a predetermined range thereof, the address memory section can be omitted to reduce the hardware thereof.

In addition, although the address generator 9 produces addresses by increasing from the lower limit value registered in the lower limit register 7b to the upper limit value registered in the upper limit register 7a one by one, on the contrary to this example, the addresses may be produced by decreasing from the upper limit value registered in the upper limit register 7a to the lower limit value registered in the lower limit register 7b one by one.

As described above, according to the present invention, the data transmission device detects the data on the external bus and a part or all of the data to be transmitted is previously stored in the data transmission device, and only the data remaining in the external memory is obtained by accessing to the external memory, whereby the data can be transmitted to the external destination at a low frequency of use of the external bus. Moreover, even in the case where the data transmission device is allowed to use the external bus at a low frequency of use, a high data transmission efficiency can be obtained. And since the processor is allowed to use the external bus without so much interruption due to use by the data transmission device, the deterioration of the efficiency of the processor during the process of the data transmission can be avoided.

What is claimed is:

1. A data transmission system connected to a common bus for connecting in common a memory for storing data and a processor for processing the data stored in the memory, and for transmitting data, produced by the processor, through a data input/output port to an external destination, said data transmission comprising:

a data conduct device, connected to said common bus, for storing parameters which represent a range of data to be transmitted and for monitoring said common bus to determine whether an access on said common bus is within said range and for generating a data fetch signal;

a data memory device for storing the data to be transmitted; and a bus control means, connected to said common bus, for reading data to be transmitted from said common bus in response to said data fetch signal from said data conduct device and for writing data into said data memory device;

wherein the parameter for data transmission is set prior to the production of the transmission data by said processor, and wherein said data conduct device monitors the common bus in the period when said processor is producing the transmission data, and when the data to be transmitted appears on the bus, said data conduct device transmits a signal to said bus control means so that said bus control means receives the signal from said data conduct device and causes the data appearing on the common bus to be written into said data memory device, and wherein in the period when data transmission is to be carried out, if data to be transmitted is stored in said data memory device, then the data stored in said data memory device is transmitted to the external destination.

2. The data transmission system according to claim 1, wherein in the absence of data to be transmitted being stored in said data memory device when data transmission is to be carried out, said data conduct device produces an address of data stored in the memory, and wherein said bus control means causes the data stored in the memory to be transmitted to the external destination.

3. A data transmission system connected to a common bus for connecting in common a memory for storing data and a processor for processing the data stored in the memory, and for transmitting data, produced by the processor, through a data input/output port to an external destination, said data transmission system comprising:

a data conduct device which includes: a parameter memory section for storing parameters which represent a range of data to be transmitted; an address comparator section, connected to said common bus, for monitoring said common bus and for comparing an address said common bus with said range of data to be transmitted to determine whether an access on said common bus is within said range and for generating a data fetch signal; and an address generator for producing an address of data to be transmitted to said external destination from the data stored in said parameter memory section and for generating a data request signal;

a data memory device which includes: a data memory section for storing the data to be transmitted to said external destination and a validity bit memory section for storing validity bits related to the data;

a bus control means connected to said common bus and said data memory device, for reading data to be transmitted from said common bus in response to said data fetch signal and said data request signal from said data conduct device and for writing the data into said data memory device;

wherein the parameter for the data transmission is set prior to the production of the transmission data by said processor, and in the period when said processor is producing the transmission data, said data conduct device monitors the address on said common bus, wherein the address on said common bus is compared with the parameter stored in the parameter memory section by said address comparator section, and when the data on said common bus is in the range of data transmission, said address comparator section transmits a signal to said bus control means so that said bus control means receives the signal from said data conduct device and causes the data on said common bus together with the validity bit to be written into said data memory device;

and wherein when carrying out the data transmission, said address generator sequentially generates the address of the transmission data and said data memory device detects the validity bit corresponding to the address to thereby determine the validity of the data, and when the data stored in said data memory section is determined to be valid, then the data stores in said data memory section is transmitted to said external destination, and when the data in said data memory section is determined to be invalid, then said bus control means access said memory at an address generated by said address generator, whereby data stored in said memory is transmitted to said external destination.

4. A data transmission system according to claim 3, wherein said data memory device further comprises an address memory section for storing the address of the data to be transmitted within the memory, and wherein at the same time said bus control means receives the signal from said data conduct device to write the data on said common bus together with the validity bit into said data memory device, the address on said common bus is written in said address memory section, and when transmitting the data stored in said data memory device, the address generated by said address generator is searched in said address memory section to transmit the data in said data stored memory section corresponding to the address.

5. A data transmission system connected to a common bus for connecting in common a memory for storing data and a processor for processing the data stored in the memory, and for transmitting data, produced by the processor, through a data input/output port to an external destination, said data transmission system comprising:

a data conduct device which includes: a parameter memory section for storing parameters which represent a range of data to be transmitted; and an address comparator section, connected to said common bus, for monitoring said common bus and for comparing an address on said common bus with said range of data to be transmitted to determine so as to thereby calculate the transmission order of the data to be transmitted to said external destination;

a data memory device which includes: a data memory section for storing the data to be transmitted to said external destination using the transmission order as the address; and a validity bit memory section for storing validity bits related to the data;

a bus control means connected to said common bus and said data memory device, for reading data to be transmitted from said common bus in response to said data fetch signal and said data request signal from said data conduct device and for writing the data into said data memory device;

wherein the parameter for the data transmission is set prior to the production of the transmission data by said processor, and in the period when said processor is producing the transmission data, said data conduct device monitors the address on said common bus, wherein the address on said common bus is compared with the parameter stored in the parameter memory section by said address comparator section, and when the data on said common bus is in the range of data transmission, said address comparator section transmits a signal to said bus control means so that said bus control means receives the signal from said data conduct device and causes the data on said common bus together with the validity bit into said data memory device;

and wherein when carrying out the data transmission, said address generator sequentially generates the address of the transmission data and said data memory device detects the validity bit corresponding to the address to thereby determine the validity of the data, and when the data stored in said data memory section is determined to be valid, then the data stored in said data memory section is transmitted to said external destination, and when the data in said data memory section is determined to be invalid, then said bus control means accesses said memory at an address generated by said address generator, whereby data stored in said memory is transmitted to said external destination.

6. The data transmission system according to claim 5, wherein said data conduct device further includes an address generator for generating the address of the data to be transmitted from the data stored in said parameter memory section, and wherein when carrying out the data transmission, said data memory device sequentially detects the validity bit corresponding to the data stored in said data memory section to thereby determine the validity of the data, and when the data stored in said data memory section is determined to be valid, then the data stored in said data memory section is transmitted to said external destination, and when the data stored in said data memory section is determined to be invalid, then said bus control means accesses said memory at an address generated by said address generator, whereby data stored in said memory is transmitted to said external destination.

* * * * *